(12) United States Patent
Xiao et al.

(10) Patent No.: US 9,831,744 B2
(45) Date of Patent: Nov. 28, 2017

(54) DEVICE FOR GENERATING ELECTRICITY

(71) Applicant: BYD Company Limited, Shenzhen (CN)

(72) Inventors: Hong Xiao, Shenzhen (CN); Jianfeng Yang, Shenzhen (CN); Conghua Jiang, Shenzhen (CN); Xiang Ao, Shenzhen (CN); Hu Zhou, Shenzhen (CN)

(73) Assignee: BYD Company Limited, Guangdong (CN)

( * ) Notice: Subject to any disclaimer, the term of this patent is extended or adjusted under 35 U.S.C. 154(b) by 70 days.

(21) Appl. No.: 14/894,906

(22) PCT Filed: Jul. 30, 2014

(86) PCT No.: PCT/CN2014/083327
§ 371 (c)(1),
(2) Date: Nov. 30, 2015

(87) PCT Pub. No.: WO2015/014288
PCT Pub. Date: Feb. 5, 2015

(65) Prior Publication Data
US 2016/0134172 A1    May 12, 2016

(30) Foreign Application Priority Data

Jul. 30, 2013   (CN) .................... 2013 2 0461385 U

(51) Int. Cl.
*F02B 63/04*        (2006.01)
*H02K 7/10*         (2006.01)
(Continued)

(52) U.S. Cl.
CPC ............ *H02K 7/1807* (2013.01); *F03G 7/08* (2013.01); *G04C 10/00* (2013.01); *H02K 7/116* (2013.01); *H02K 11/30* (2016.01); *H02K 35/02* (2013.01)

(58) Field of Classification Search
USPC ......................................................... 290/1 C
See application file for complete search history.

(56) References Cited

U.S. PATENT DOCUMENTS 4,539,497 A * 9/1985 Boyer ................... B60C 23/041
                                                        180/65.51
4,761,577 A * 8/1988 Thomas ................. B60B 19/00
                                                        310/67 A
(Continued)

FOREIGN PATENT DOCUMENTS

CN           2379619 Y      5/2000
CN         102052273 A      5/2011
(Continued)

OTHER PUBLICATIONS

International Search Report and the Written Opinion from International Application No. PCT/CN2014/083327, dated Oct. 27, 2014; 12 pages.

*Primary Examiner* — Pedro J Cuevas
(74) *Attorney, Agent, or Firm* — Calfee, Halter & Griswold LLP

(57) ABSTRACT

A device for generating electricity includes a support; a driving element rotatably mounted on the support; an electricity generator disposed on the support; a circuit board connected to the electricity generator; and a drive assembly disposed on the support and including an input gear and an output gear. The driving element is coupled with the input gear to drive the input gear to rotate, and the output gear is coupled with the electricity generator and driven to rotate by the input gear.

16 Claims, 16 Drawing Sheets

(51) Int. Cl.
  *H02K 7/18* (2006.01)
  *H02K 11/30* (2016.01)
  *H02K 7/116* (2006.01)
  *F03G 7/08* (2006.01)
  *G04C 10/00* (2006.01)
  *H02K 35/02* (2006.01)

(56) References Cited

U.S. PATENT DOCUMENTS

| | | | |
|---|---|---|---|
| 4,939,707 A | 7/1990 | Nagao | |
| 6,016,289 A | 1/2000 | Kaelin | |
| 7,439,650 B2* | 10/2008 | Sawada | G04C 3/12 310/316.02 |
| 9,434,218 B2* | 9/2016 | Root | B60C 23/041 |
| 9,665,069 B2* | 5/2017 | Hamatani | G04C 10/00 |
| 2007/0001547 A1* | 1/2007 | Sawada | G04C 3/12 310/317 |
| 2010/0237748 A1 | 9/2010 | Malkin et al. | |
| 2010/0253088 A1 | 10/2010 | Weinberger et al. | |
| 2010/0264668 A1 | 10/2010 | Hughes, Sr. | |
| 2015/0193022 A1* | 7/2015 | Zhong | G06F 3/03543 290/1 C |
| 2015/0239309 A1* | 8/2015 | Root | B60C 23/041 152/419 |
| 2016/0170377 A1* | 6/2016 | Hamatani | G04C 10/00 368/204 |

FOREIGN PATENT DOCUMENTS

| | | |
|---|---|---|
| CN | 202250657 U | 5/2012 |
| CN | 202268735 U | 6/2012 |
| CN | 102878038 A | 1/2013 |
| CN | 202645903 U | 1/2013 |
| CN | 202789362 U | 3/2013 |
| CN | 202954932 U | 5/2013 |
| CN | 203430718 U | 2/2014 |
| CN | 203430714 U | 12/2014 |
| EP | 1115042 | 11/2001 |
| WO | 2009004645 | 1/2009 |
| WO | 2011153563 | 12/2011 |

* cited by examiner

DEVICE FOR GENERATING ELECTRICITY

CROSS-REFERENCE TO RELATED APPLICATION

This application is the U.S. national phase entry of PCT/CN2014/083327, with an international filing date of 30 Jul. 2014, which claims the benefit of Chinese Application Serial No. 201320461385.2, with a filing date of 30 Jul. 2013, the entire disclosures of which are fully incorporated herein by reference.

FIELD

The present disclosure relates to the field of electricity generating, more particularly to a device for generating electricity.

BACKGROUND

Environmental protection is an important theme today. With the pursuit of low carbon life, green energy and the development of the science and technology, energy acquisition technologies, such like a technology of converting tiny vibration energy into electricity energy, attracts more and more attention, and electronic components adapted to be driven by an energy acquisition device is more and more popular. Meanwhile, with widespread uses of all kinds of portable electronic products (such as mobile phones, cordless phones, digital cameras, etc.), users always complain the problems of shortage of battery due to most of these electronic products using external charger to charge. Since the battery needs to be charged frequently, but still cannot last longer, it is inconvenient for users to charge their portable electronic products timely and anywhere.

SUMMARY

Embodiments of the present disclosure seek to solve at least one of the problems existing in the related art to at least some extent.

Embodiments of the present disclosure provide a portable device for generating electricity. The device includes: a support; a driving element rotatably mounted on the support; an electricity generator disposed on the support; a circuit board connected to the generator; and a drive assembly disposed on the support and comprising an input gear and an output gear, in which the driving element is coupled with the input gear to drive the input gear to rotate, and the output gear is coupled with the generator and driven to rotate by the input gear.

In some embodiments, the drive assembly further includes a first speed-increasing gear set including: a first gear meshed with the input gear; and a second gear coupled with the first gear coaxially to rotate with the first gear and meshed with the output gear.

In some embodiments, a teeth number of the first gear is less than that of the second gear.

In some embodiments, the second gear defines a first gear hole having a non-circular cross-section, and the first gear has a first gear shaft having a non-circular cross-section and adapted to fit within the first gear hole.

In some embodiments, the drive assembly further comprises a first speed-increasing gear set and a second speed-increasing gear set. The first speed-increasing gear set comprises a first gear meshed with the input gear, and a second gear coupled with the first gear coaxially to rotate with the first gear. The second-increasing gear set comprises a third gear meshed with the second gear, and a fourth gear coupled with the third gear coaxially to rotate with the third gear and meshed with the output gear.

In some embodiments, a teeth number of the first gear is less than that of the second gear, and a teeth number of the third gear is less than that of the fourth gear.

In some embodiments, the second gear defines a first gear hole having a non-circular cross-section, and the first gear has a first gear shaft having a non-circular cross-section and adapted to fit within the first gear hole; in which the fourth gear defines a second gear hole having a non-circular cross-section, and the third gear has a second gear shaft having a non-circular cross-section and adapted to fit within the second gear hole.

In some embodiments, the drive assembly further comprises a first one-way transmitting unit coupled with the input and output gears respectively.

In some embodiments, the first one-way transmitting unit includes: a fifth gear meshed with the input gear and rotatable in a first rotation direction and a second rotation direction; a first direction-switching column coupled with the fifth gear so as to rotate with the fifth gear; a sixth gear meshed with the output gear; and a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear.

In some embodiments, the first direction-switching column defines a third gear hole having a non-circular cross-section, and the fifth gear has a third gear shaft having a non-circular shaft and adapted to fit within the third gear hole.

In some embodiments, the drive assembly further comprises a first one-way transmitting unit and a third speed-increasing gear set. The first one-way transmitting unit includes: a fifth gear meshed with the input gear and rotatable in a first rotation direction and a second rotation direction; a first direction-switching column coupled with the fifth gear so as to rotate with the fifth gear; a sixth gear; and a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear. The third speed-increasing gear set is meshed with the sixth gear and the output gear respectively.

In some embodiments, the first direction-switching column defines a third gear hole having a non-circular cross-section, and the fifth gear has a third gear shaft having a non-circular cross-section and adapted to fit within the third gear hole.

In some embodiments, the drive assembly further comprises a first one-way transmitting unit, a second one-way transmitting unit and a fourth speed-increasing gear set. the first one-way transmitting unit includes: a fifth gear meshed with the input gear and rotatable in a first rotation direction and a second rotation direction; a first direction-switching column coupled with the fifth gear so as to rotate with the fifth gear; a sixth gear; and a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear. The third speed-increasing gear set is meshed with the sixth gear and the output gear respectively.

In some embodiments, the first direction-switching column defines a third gear hole having a non-circular cross-section, and the fifth gear has a third gear shaft having a non-circular cross-section and adapted to fit within the third gear hole.

In some embodiments, the drive assembly further comprises a first one-way transmitting unit, a second one-way transmitting unit and a fourth speed-increasing gear set. the first one-way transmitting unit includes: a fifth gear meshed with the input gear and rotatable in a first rotation direction and a second rotation direction; a first direction-switching column coupled with the fifth gear so as to rotate with the fifth gear; a sixth gear; and a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear. The second one-way transmitting unit includes: a seventh gear meshed with the input gear and rotatable in a third rotation direction and a fourth rotation direction; a second direction-switching column coupled with the seventh gear so as to rotate with the seventh gear; an eighth gear meshed with the sixth gear; and a second direction-switching block configured to press the eighth gear against the second direction-switching column when the seventh gear rotates in the fourth rotation direction so as to drive the eighth gear rotate with the second direction-switching column, and to release the eighth gear from the second direction-switching column when the seventh gear rotates in the third rotation direction such that the second direction-switching column is rotatable independently relative to the eight gear. The fourth speed-increasing gear set is meshed with the eighth gear and the output gear respectively.

In some embodiments, the first direction-switching column defines a third gear hole having a non-circular cross-section, and the fifth gear has a third gear shaft having a non-circular cross-section and adapted to fit within the third gear hole. The second direction-switching column defines a fourth gear hole having a non-circular cross-section, and the seventh gear has a fourth gear shaft having a non-circular cross-section and adapted to fit within the fourth gear hole.

With the device for generating electricity according to embodiments of the present disclosure, by the rotation of the driving element, the kinetic energy of the driving element can be effectively transformed to electricity, and the electricity can be effectively collected, therefore, it is convenient for users to charge their portable electronic products timely and anywhere. Furthermore, the electricity generating of the device does not generate any pollutant, thus, the device for generating electricity is environmentally friendly. In addition, the device is portable and easily to carry.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
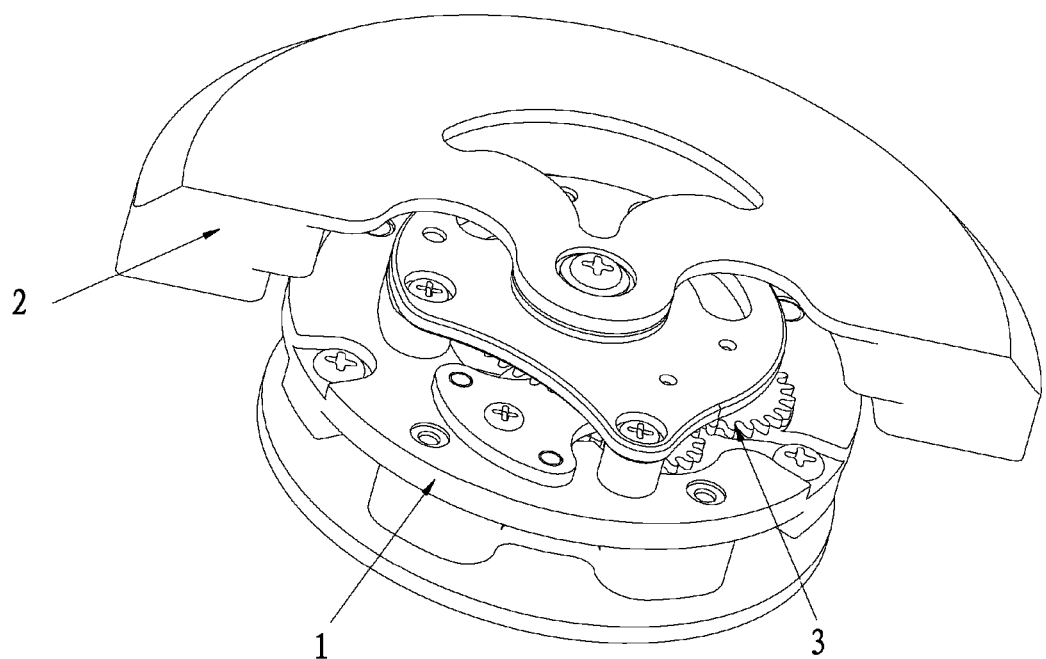
FIG. 1 shows a schematic view of a device for generating electricity according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, phrase "a plurality of" means two or more than two, unless specified otherwise.

Environmental protection is an important theme today. With the pursuit of low carbon life, green energy and the development of the science and technology, energy acquisition technologies, such like a technology of converting tiny vibration energy into electricity energy, attracts more and more attention, and electronic components are adapted to be driven by an energy acquisition device is more and more popular. Meanwhile, with widespread uses of all kinds of portable electronic products (such as mobile phones, cordless phones, digital cameras, etc.), users always complain the problems of shortage of battery due to most of these electronic products using external charger to charge. Since the battery needs to be charged frequently, but still cannot last longer, it is inconvenient for users to charge their portable electronic products timely and anywhere. In order to solve at least one of the problems existing in the related art, a device for generating electricity is provided and is described in detail below.

Example 1

Figure 2:
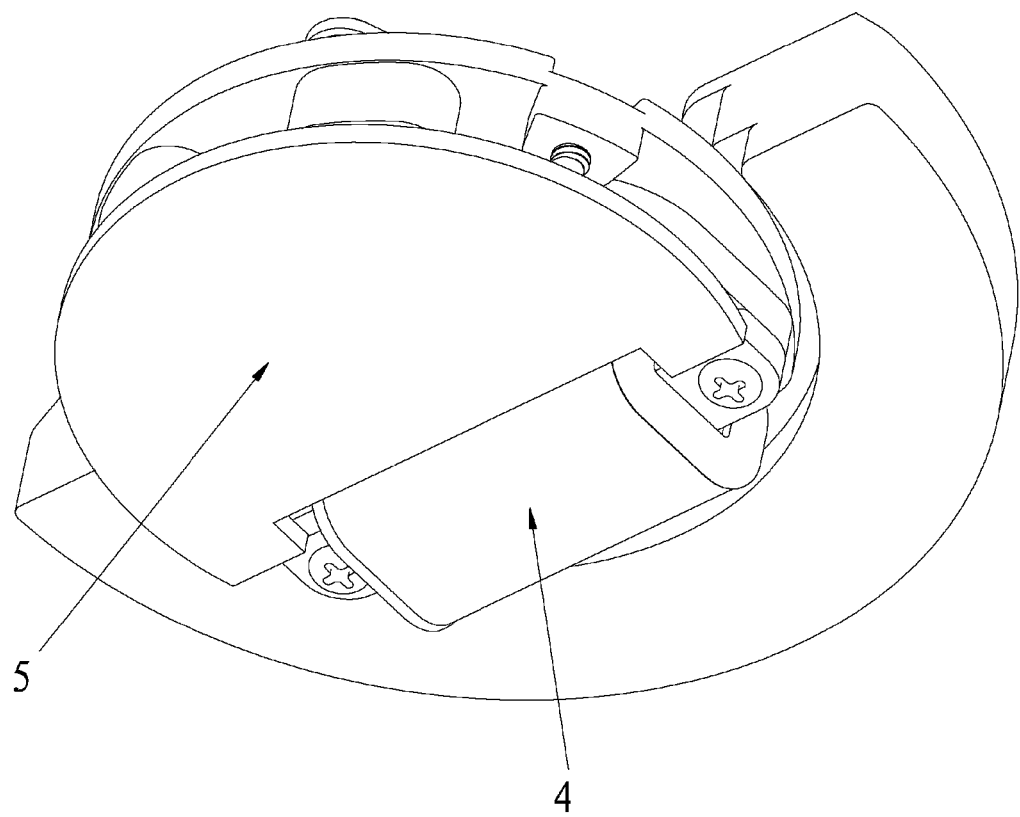
FIG. 2 shows a schematic view illustrating a bottom of a device for generating electricity according to an embodiment of the present disclosure.

As shown in FIGS. 1-2, in an embodiment of present disclosure, a device for generating electricity is provided. The device includes: a support 1; a driving element 2 rotatably mounted on the support 1; an electricity generator 4 disposed on the support 1; a circuit board 5 connected to the electricity generator 4; and a drive assembly 3 disposed on the support 1. The drive assembly 3 is coupled to the driving element 2 and the electricity generator 4 separately, so that the electricity generator 4 may convert the kinetic energy via the rotation or swinging of the driving element 2 into electrical energy.

In some embodiments, the drive assembly 3 is a gear transmission assembly. The drive assembly 3 includes an input gear 31 and an output gear 32 cooperated with each other. The driving element 2 is coupled with the input gear 31 to drive the input gear 31 to rotate, and the output gear 32 is coupled with the electricity generator 4 and driven to rotate by the input gear 31.

Thus, by using the gear transmission assembly, the drive assembly 3 is simple in structure, easy to implement, and the stability of the drive assembly 3 is also improved.

In some embodiments, the input gear 31 and the output gear 32 cooperated with each other means that the input gear 31 is meshed with the output gear 32 directly, or the input gear 31 and the output gear 32 are coupled through other components and one can drive the other gear to rotate. It is well known to those skilled in the art.

With the device for generating electricity according to embodiments of the present disclosure, by the rotation of the driving element, the kinetic energy of the driving element can be effectively transformed to electricity. Thus, the energy is effectively collected, the energy conservation rate from the kinetic energy to electricity is improved and it is environmentally friendly. Furthermore, the device is portable and easily to carry.

Example 2

As shown in FIG. 1, a support 1 is the mounting body for supporting the other components of the device for generating electricity. The support 1 defines an upper part and a lower part. The driving element 2 is disposed above the upper part of the support 1. The drive assembly 3 is disposed in the upper part of the support 1. As shown in FIG. 2, the electricity generator 4 and the circuit board 5 are disposed in the lower part of the support 1.

In some embodiments, the driving element 2 includes a pendulum body with a sector-shaped and a pendulum plate.

In some embodiments, the pendulum body is made of metal with high density. The driving element 2 may swing along with the movements of the device, so as to provide power to the drive assembly 3.

Example 3

Figure 3:
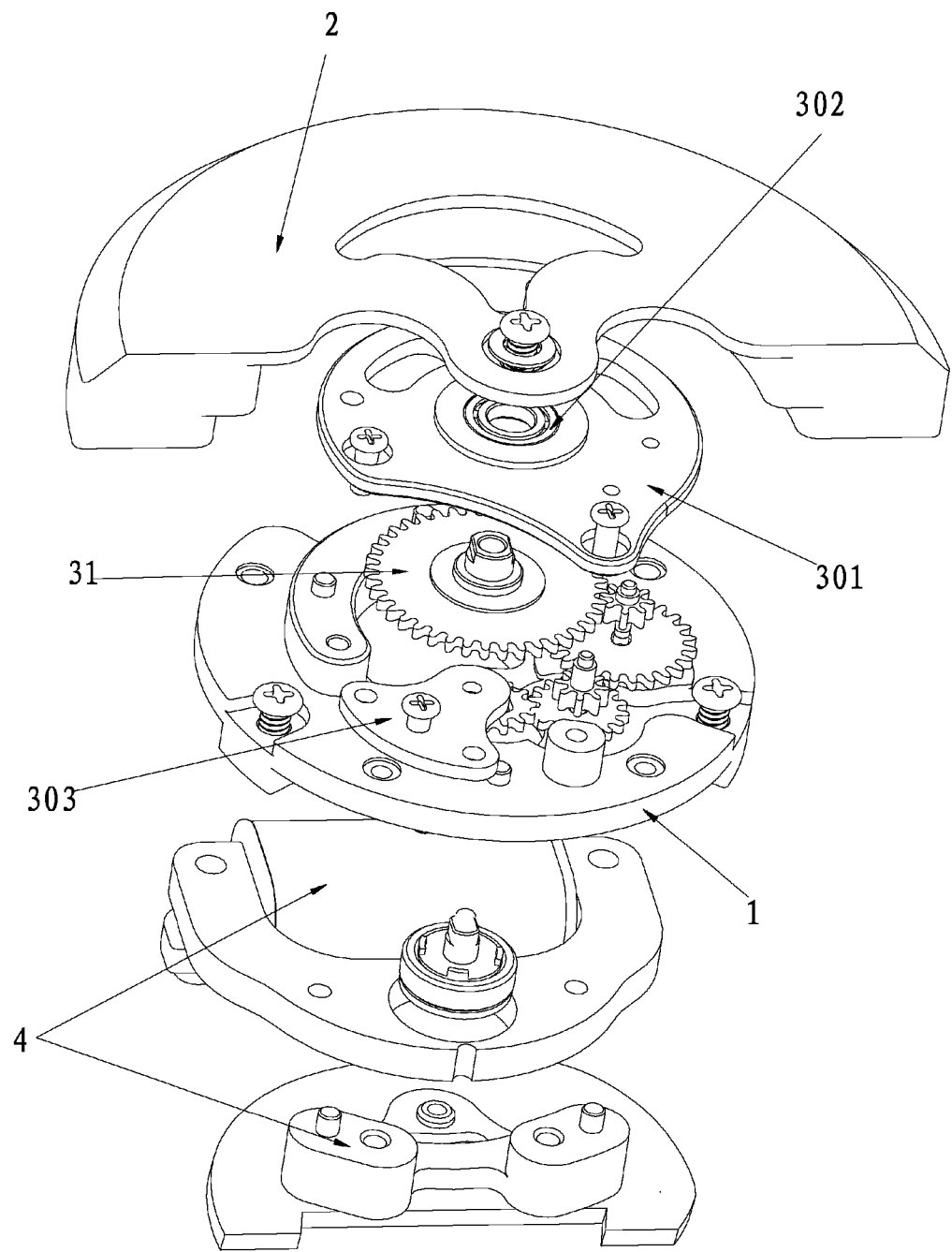
FIG. 3 shows an exploded perspective view of a device for generating electricity according to an embodiment of the present disclosure.
Figure 4:
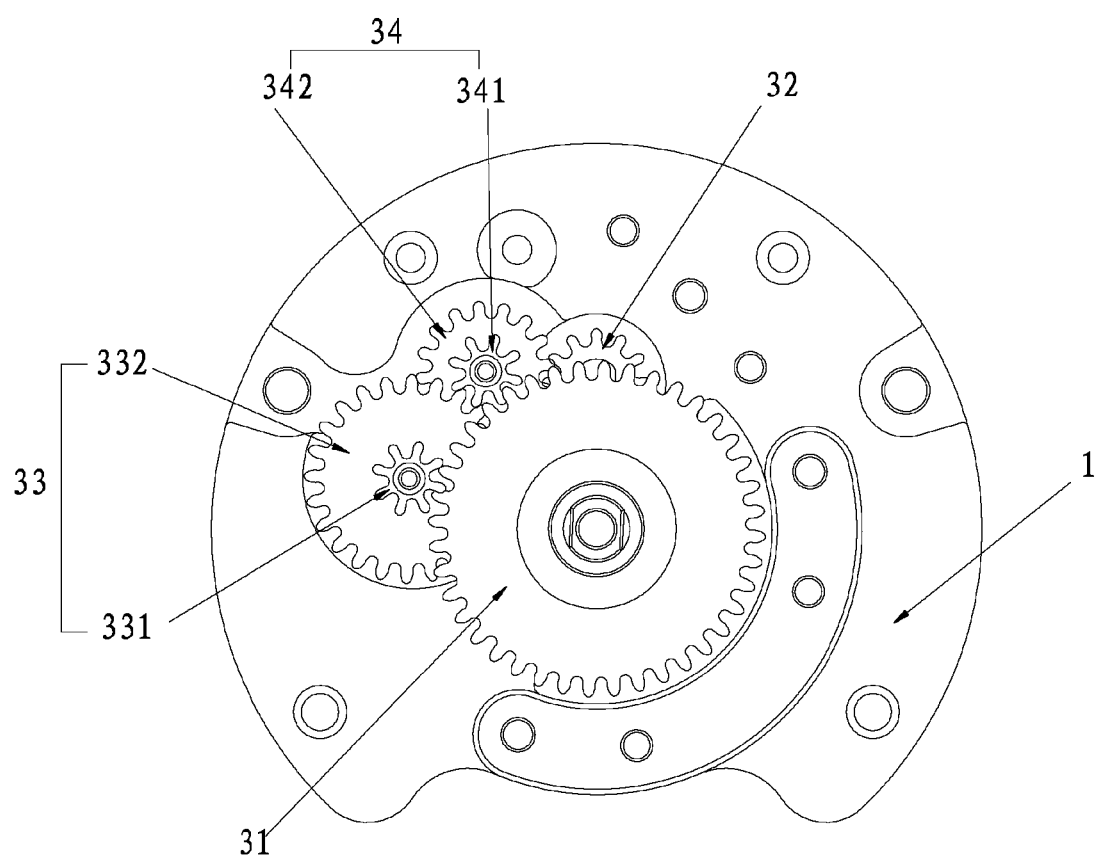
FIG. 4 shows a schematic view illustrating a support and a drive assembly of a device for generating electricity according to an embodiment of the present disclosure.
Figure 5:
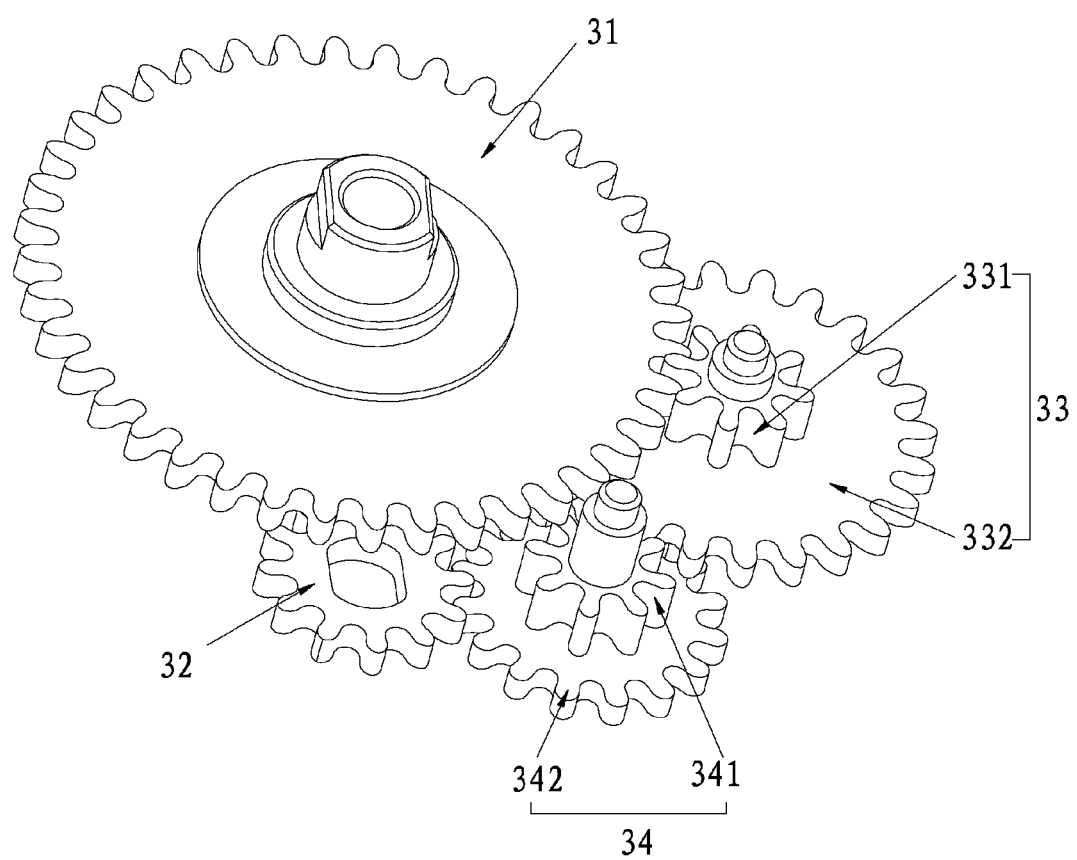
FIG. 5 shows a schematic view illustrating a drive assembly of a device for generating electricity according to an embodiment of the present disclosure.

As shown in FIGS. 3-5, in an embodiment of present disclosure, the drive assembly 3 further includes a first speed-increasing gear set 33.

The first speed-increasing gear set 33 includes a first gear 331 and second gear 332. The first gear 331 is meshed with the input gear 31, and the second gear 332 is coupled with the first gear 331 coaxially to rotate with the first gear 331 and is meshed with the output gear 32. In some embodiments, a teeth number of the first gear 331 is less than that of the second gear 332. With the first speed-increasing gear set 33, the speed of the output gear 32 may be increased, thereby facilitating the generating electricity of the electricity generator 4.

In some embodiments, the drive assembly 3 further includes a second speed-increasing gear set 34. The second speed-increasing gear set 34 includes a third gear 341 and a fourth gear 342. The third gear 341 is meshed with the second gear 332, and the fourth gear 342 is coupled with the third gear 341 coaxially to rotate with the third gear 341 and is meshed with the output gear 32. In some embodiments, a teeth number of the third gear 341 is less than that of the fourth gear 342. With the second speed-increasing gear set 34, thereby further facilitating the generating electricity of the electricity generator 4.

In some embodiments, the drive assembly 3 may include more than three speed gear sets, which can be understood by those of ordinary skill in the art.

In some embodiments, the second gear 332 defines a first gear hole (not shown) having a non-circular cross-section, and the first gear 331 has a first gear shaft (not shown) having a non-circular cross-section and adapted to fit within the first gear hole. The fourth gear 342 defines a second gear hole having a non-circular cross-section, and the third gear 341 has a second gear shaft having a non-circular cross-section and adapted to fit within the second gear hole.

The first gear shaft is fitted within the first gear hole, such that the first gear 331 and the second gear 332 can rotate together, and the second gear shaft is fitted within the second gear hole, such that the third gear 341 and the fourth gear 342 can rotate together. Moreover, a clearance is formed between the first gear shaft and the first gear hole and between the second gear shaft and the second gear hole respectively.

Thus, the first gear 331 and second gear 332 are cooperated stably, and the third gear 341 and the fourth gear 342 are cooperated stably, which improves the stability of the first speed-increasing gear set 33 and the second speed-increasing gear set 34. Furthermore, the drive assembly is simple in structure and easily to be assembled.

In some embodiments, the first gear 331 and second gear 332 also may be connected through other method, for example, by clamping, welding, etc. Similarly, the third gear 341 and the fourth gear 342 also may be connected through other method, for example, by clamping, welding, etc.

In some embodiments of the present disclosure, the drive assembly 3 includes a first positioning plate 301, a second positioning plate 303, a first gear 331, a second gear 332, a third gear 341, a fourth gear 342, an input gear 31, an output gear 32 and a rolling bearing 302. The rolling bearing 302 is disposed in the first positioning plate 301, and the input gear 31 is coupled to the driving element 2.

The inner ring of the rolling bearing 302 is fixedly connected with the input gear 31, and the outer ring of the bearing outer ring 302 is disposed in the first positioning plate 301 by interference fit. The input gear 31 is fixedly connected with the driving element 2 by mean of a screw. The rotation of the driving element 2 may drive the input gear 31 to rotate with the driving element 2.

Figure 12:
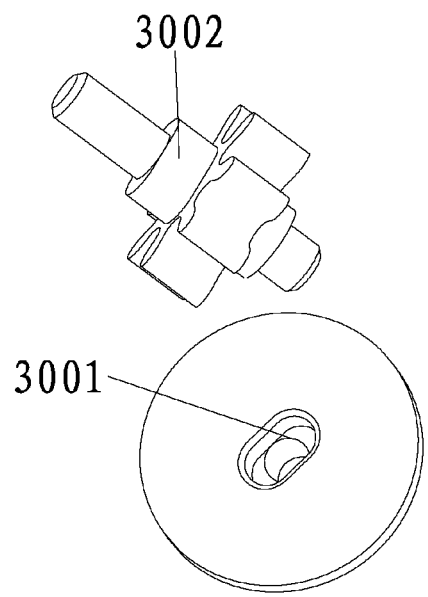
FIG. 12 shows an exploded perspective view illustrating two gears coupled with clearance of a device for generating electricity according to an embodiment of the present disclosure.
Figure 13:
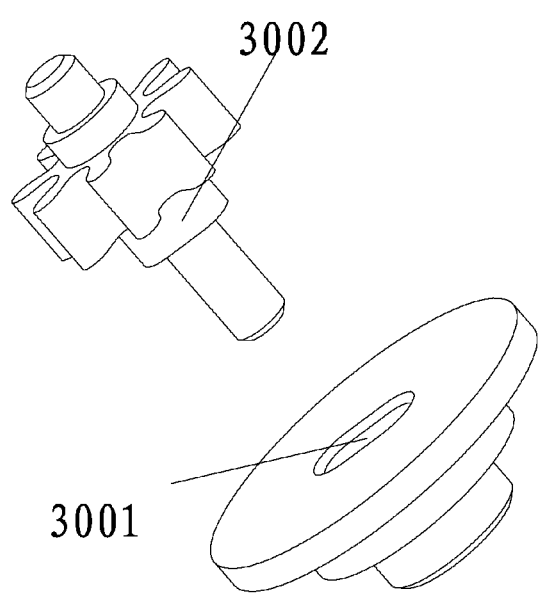
FIG. 13 shows an exploded perspective view illustrating two gears coupled with clearance of a device for generating electricity according to an embodiment of the present disclosure.

As shown in FIGS. 12-13, in some embodiments, one of the first gear 331 and the second gear 332 may have a protrusion 3002 with a non-circular cross-section, the other one of the first gear 331 and the second gear 332 may have a groove 3001 with a non-circular cross-section. When the first gear 331 is coupled with the second gear 332, the protrusion 3002 is in clearance fit with the groove 3001, so that when the first gear 331 rotates, the second gear 332 can be driven by the first gear 331 to rotate with the first gear 331.

Similarly, one of the second gear 341 and the fourth gear 342 may have a protrusion with a non-circular cross-section, the other one of the first gear 331 and the second gear 332 may have a groove 3001 with a non-circular cross-section, the other one of the second gear 341 and the fourth gear 342 may have a groove 3001 with a non-circular cross-section, and the protrusion is in clearance fit with the groove, thus, the fourth gear 342 can be driven by the third gear 341 to rotate with the third gear 341. The first gear 331 is meshed with the input gear 31, the second gear 332 is meshed with the third gear 341, and the fourth gear 342 is meshed with the output gear 32.

As shown in FIGS. 1-5, the movement of the drive source, such like a user, drives the driving element 2 swinging back and forth. When the driving element 2 is rotated in clockwise, the input shaft 31 fixed with the driving element 2 is also rotated in clockwise. The first gear 331 is meshed with the input gear 31 so as to rotate in an opposite direction, that is, in anti-clockwise. The first gear 331 is coupled with the second gear 332, so that the second gear 332 is rotated in anti-clockwise. The second gear 332 is meshed with the third gear 341, so that the third gear 341 rotates in clockwise. The third gear 341 and the fourth gear 342 are coupled, thus the rotation direction of the third gear 341 and the fourth gear 342 are the same, and the fourth gear 342 rotates in clockwise. The output gear 32 meshed with the fourth gear 342 rotates in anti-clockwise.

As shown in FIG. 4, when the driving element 2 rotates in anti-clockwise, the input shaft 31 fixed with the driving element 2 also rotates in anti-clockwise. The first gear 331 meshed with the input gear 31 rotates in an opposite direction, that is, in clockwise. The first gear 331 is coupled with the second gear 332, so that the second gear 332 rotates in clockwise. The second gear 332 is meshed with the third gear 341, so that the third gear 341 is rotated in anti-clockwise. The third gear 341 and the fourth gear 342 are coupled, thus the rotation direction of the third gear 341 and the fourth gear 342 are the same, and the fourth gear 342 rotates in anti-clockwise. The output gear 32 meshed with the fourth gear 342 rotates in clockwise.

Therefore, with the drive assembly 3, the rotation of the driving element 2 drives the output gear 32 to rotate. Meanwhile, the drive assembly 3 has the function to increase the speed. For example, the rotation speed may be increased via a first-level speed-increasing unit formed by the input gear 31 and the first gear 331, a second-level speed-increasing unit formed by the second gear 332 and the third speed gear 341, and a third-level speed-increasing unit formed by the fourth gear 342 and the output gear 32.

For example, a transmission ratio of the first-level speed-increasing unit is 5, a transmission ratio of the second-level speed-increasing unit is 3, and a transmission ratio of the third-level speed-increasing unit is 4/3, thus, the total transmission ratio is 5*3*4/3=20. After the three levels speed-increasing units, even the rotation speed of the driving element 2 is lower, the rotation speed of the output gear 32 can be higher. The shaft of the electricity generator connected with the output gear 32 has a high rotation speed. The rotor connected with the shaft of the electricity generator has a high rotation speed to generate a high induced electromotive force, thus, not only simplifying the design of the circuit board of the device, but also improving the efficiency of energy utilization.

Example 4

Figure 6:
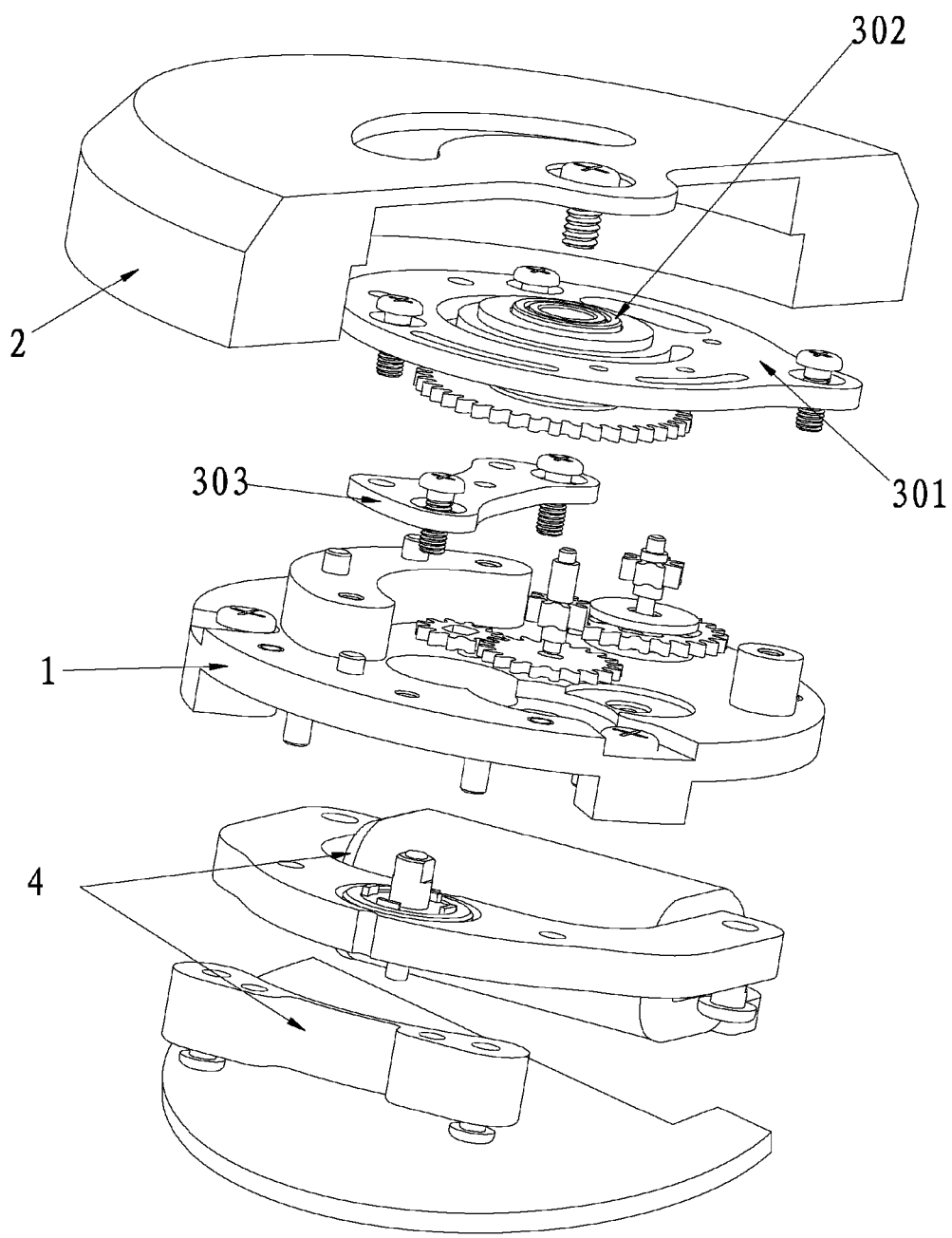
FIG. 6 shows an exploded perspective view of a device for generating electricity according to an embodiment of the present disclosure.
Figure 7:
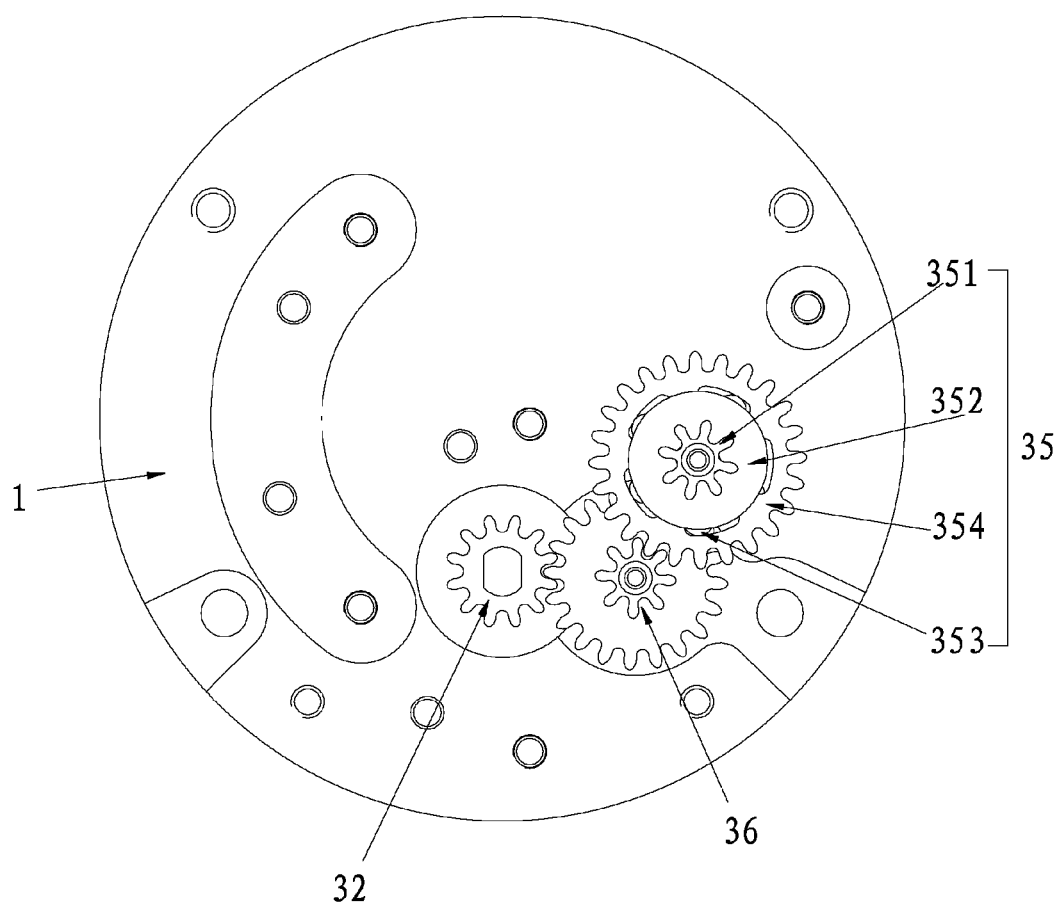
FIG. 7 shows a schematic view illustrating a support and a drive assembly of a device for generating electricity according to an embodiment of the present disclosure.
Figure 8:
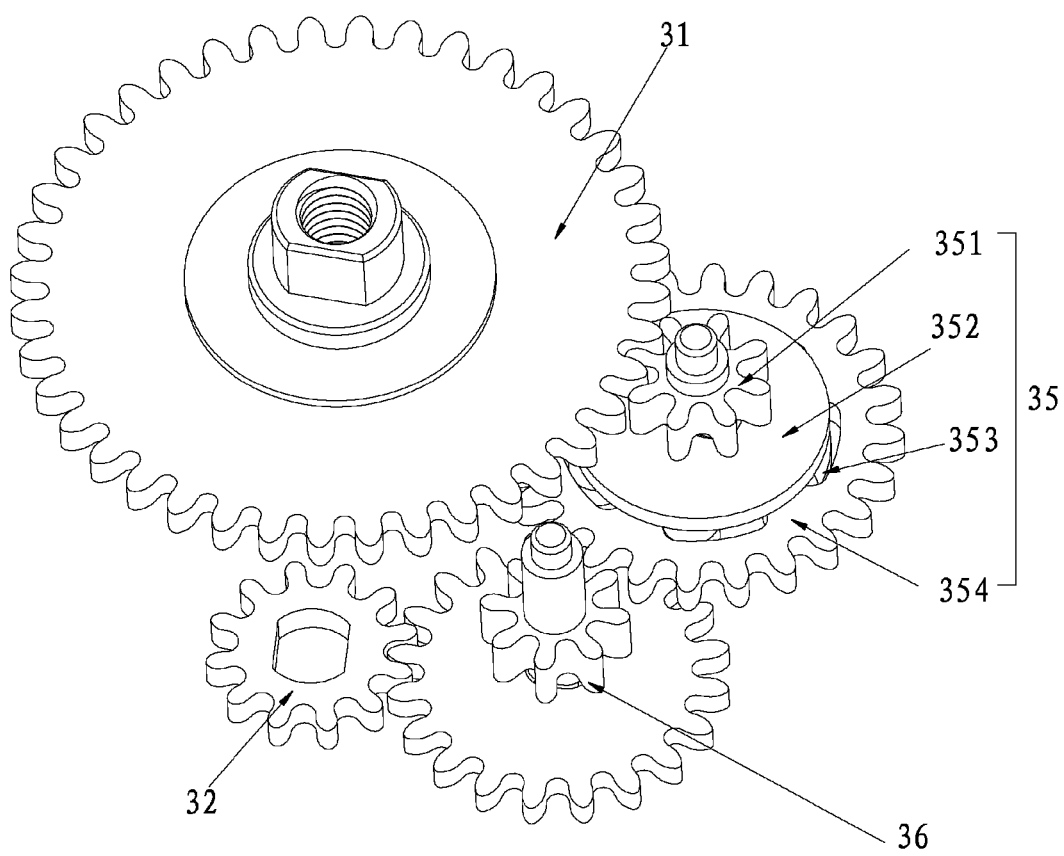
FIG. 8 shows a schematic view illustrating a drive assembly of a device for generating electricity according to an embodiment of the present disclosure.

As shown in FIGS. 6-8, the drive assembly 3 further includes a first one-way transmitting unit 35. The first one-way transmitting unit 35 is coupled with the input gear 31 and the output gear 32 respectively.

The first one-way transmitting unit 35 includes: a fifth gear 351, a first direction-switching column 352, a sixth gear 354 and a first direction-switching block 353. The fifth gear 351 is meshed with the input gear 31 and is rotatable in a first rotation direction (i.e., the anti-clockwise direction as shown in FIG. 7) and a second rotation direction (i.e., the clockwise direction as shown in FIG. 7). The first direction-switching column 352 is coupled with the fifth gear 351 so as to rotate with the fifth gear 351. The sixth gear 354 is meshed with the output gear 32. The first direction-switching block 353 is configured to press the sixth gear 354 against the first direction-switching column 352 when the fifth gear 351 rotates in the first rotation direction so as to drive the sixth gear 354 to rotate with the first direction-switching column 352, and to release the sixth gear 354 from the first direction-switching column 352 when the fifth gear 351 rotates in the second rotation direction such that the first direction-switching column 352 is rotatable independently relative to the sixth gear 354. In an embodiment, there is a gap formed between the first direction-switching block 353 and the first direction-switching column 352 or between the first direction-switching block 353 and the sixth gear 354. Thus, the output gear 32 rotates in one direction stably, it is easy for the electricity generator 4 to generate electricity.

In some embodiments of the present disclosure, the drive assembly 3 further includes a third speed-increasing gear set 36. The third speed-increasing gear set 36 is meshed with the sixth gear 354 and the output gear 32 respectively.

In some embodiments of the present disclosure, the first direction-switching column 352 defines a third gear hole having a non-circular cross-section, and the fifth gear 351 has a third gear shaft (not shown) having a non-circular shaft and adapted to fit within the third gear hole.

In some embodiments of the present disclosure, the drive assembly 3 includes a first positioning plate 301, rolling bearing 302, an input gear 31, a first one-way transmitting unit 35, a third speed-increasing gear set 36, an output gear 32 and a second positioning plate 303. The rolling bearing 302 is disposed in the first positioning plate 301. The input gear 31 is coupled to the driving element 2. The first one-way transmitting unit 35 includes a fifth gear 351, a first direction-switching column 352, a first direction-switching block 353 and a sixth gear 354.

The inner ring of the rolling bearing 302 is fixedly connected with the input gear 31, and the outer ring of the bearing outer ring 302 is disposed in the first positioning plate 301 by interference fit. The input gear 31 is connected with the driving element 2 with a screw. The rotation of the driving element 2 may drive the input gear 31 to rotate with the driving element 2 in same direction and speed.

Figure 14:
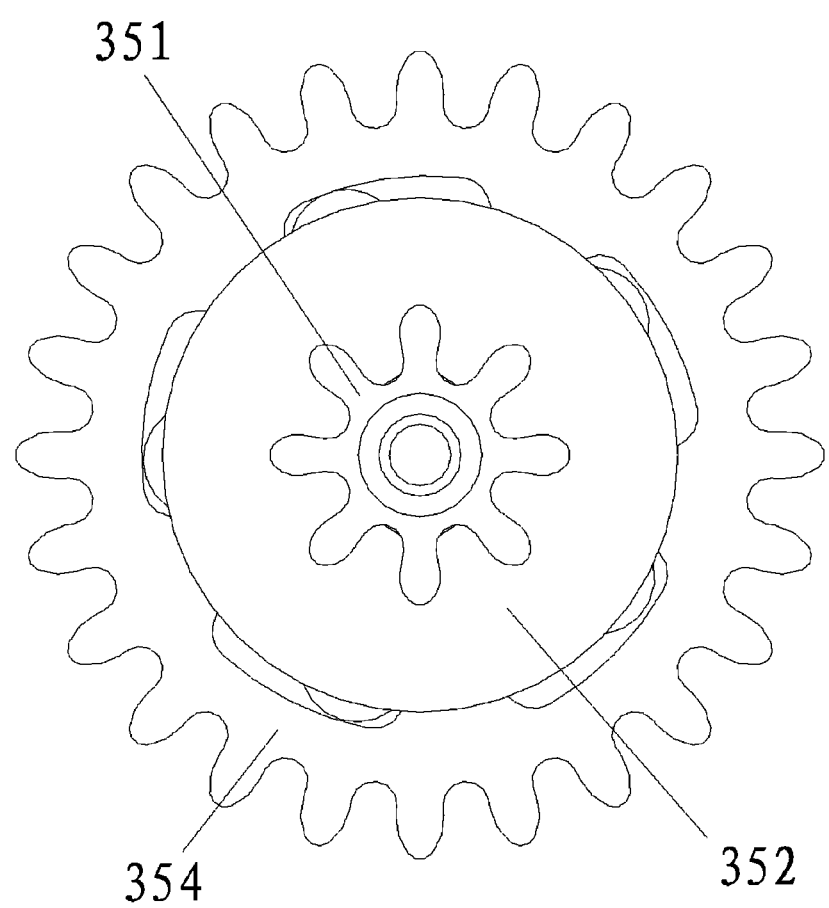
FIG. 14 shows a schematic view illustrating a first one-way transmitting unit of a device for generating electricity according to an embodiment of the present disclosure.
Figure 15:
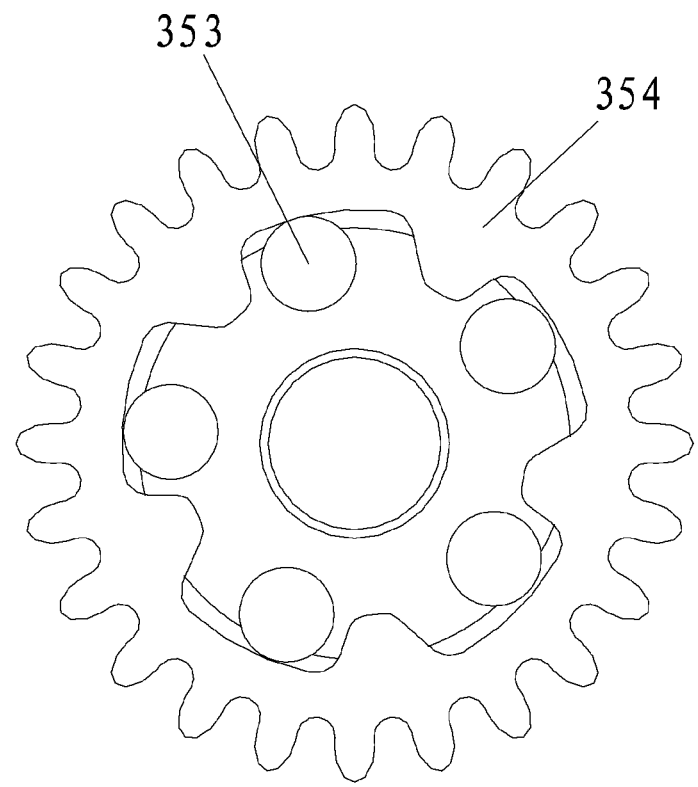
FIG. 15 shows a schematic view illustrating an engagement between a first direction-switching column and a sixth gear of a device for generating electricity according to an embodiment of the present disclosure when a fifth gear rotates in an anticlockwise direction.
Figure 16:
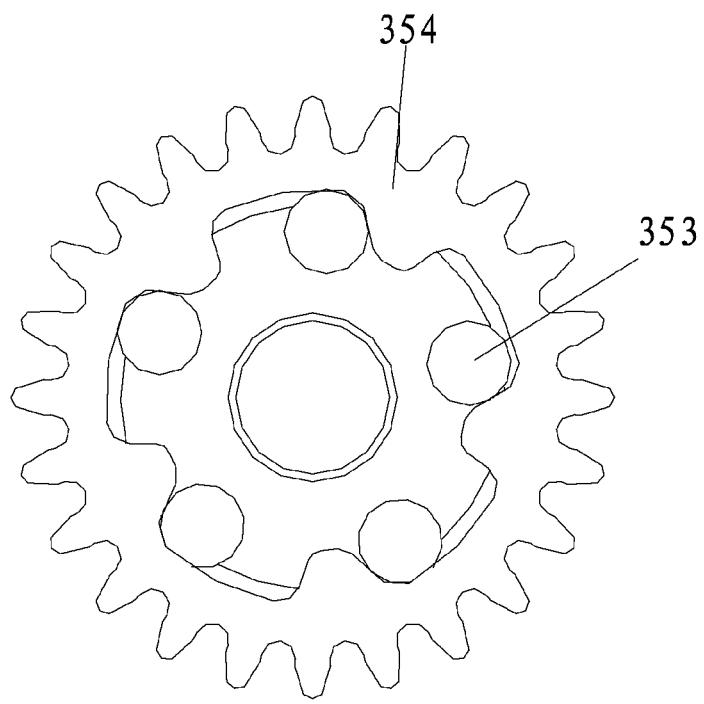
FIG. 16 shows a schematic view illustrating an engagement between a first direction-switching column and a sixth gear of a device for generating electricity according to an embodiment of the present disclosure when a fifth gear rotates in a clockwise direction.

The first direction-switching column 352 is coupled with the fifth gear 351 to rotate with the firth gear 351. The first one-way transmitting unit 35 has the function of one-way movement, for example, as shown in FIGS. 14-16, when the fifth gear 351 rotates in anti-clockwise, the first direction-switching column 352 rotates with the fifth gear 351 in anti-clockwise. The first direction-switching block 353 is configured to press the sixth gear 354 against the first direction-switching column 352. Due to the friction between the first direction-switching column 352 and the first direction-switching block 353, the first direction-switching block 353 is driven to rotate in anti-clockwise. At this time, the first direction-switching block 353 drives the sixth gear 354 to rotate in anti-clockwise.

When the fifth gear 351 rotates in clockwise, the first direction-switching column 352 coupled with the fifth gear 351 rotates in clockwise. Due to a gap formed between the first direction-switching block 353 and the first direction-switching column 352, there is no friction between the first direction-switching column 352 and the first direction-switching block 353. The first direction-switching block 353 is configured to release the sixth gear 354 from the first direction-switching column 352, such that the first direction-switching column 352 is rotatable independently relative to the sixth gear 354. The first direction-switching column 352 is coupled with the fifth gear 351 to rotate with the firth gear 351. The cooperation manner between the fifth gear 351 and the first direction-switching column 352 can refer to the foregoing embodiments and FIGS. 12-13.

The structure of the third speed gear set 36 may refer to the other speed gear set described in the foregoing embodiments. The fifth gear 351 is meshed with the input gear 31, the sixth gear 354 is meshed with one gear of the third speed gear set 36 which has a less teeth number. The output gear 32 is meshed with one gear of the third speed gear set 36 which has a larger teeth number.

As shown in FIGS. 6-8, the movement of the drive source drives the driving element 2 swinging back and forth. When the driving element 2 rotates in a clockwise direction, the input shaft 31 fixed with the driving element 2 is also rotated in the clockwise direction. The fifth gear 351 meshed with the input gear 31 is rotated in an opposite direction, that is, in an anti-clockwise direction. The fifth gear 351 is coupled with the first direction-switching column 352, so that the first direction-switching column 352 rotates in anti-clockwise. With the friction between the first direction-switching column 352 and the first direction-switching block 353, the first direction-switching column 352 drives the first direction-switching block 353 to rotate in anti-clockwise, and then the first direction-switching block 353 drives the sixth gear 354 to rotate in anti-clockwise, after being driven by the third speed-increasing gear set 36, the output gear 32 rotates in anti-clockwise.

When the driving element 2 rotates in anti-clockwise, the input shaft 31 fixed with the driving element 2 is also rotated in anti-clockwise. The fifth gear 351 meshed with the input gear 31 is rotated in an opposite direction, that is, in a clockwise direction. The fifth gear 351 is coupled with the first direction-switching column 352, so that the first direction-switching column 352 rotates in clockwise. At this time, due to a gap formed between the first direction-switching column 352 and the first direction-switching block 353, so that there is no friction between the first direction-switching column 352 and the first direction-switching block 353, and the first direction-switching column 352 is rotatable freely, the first direction-switching block 353 is motionless, such that the sixth gear 354 is motionless, and the output gear 32 couple to the sixth gear 354 is also motionless.

Therefore, when the driving element 2 is rotated in anti-clockwise, the output gear 32 is motionless, so the electricity generator is out of work. When the driving element 2 rotates in clockwise, the output gear 32 rotates in clockwise. Meanwhile, the drive assembly 3 has the function to increase the speed. For example, the rotation speed may be increased via a first-level speed-increasing unit formed by the input gear 31 and the fifth gear 351, a second-level speed-increasing unit formed by the sixth gear 354 and one gear of the third speed-increasing gear set 36 having less teeth number, and a third-level speed-increasing unit formed by one gear of the third speed-increasing gear set 36 having larger teeth number and the output gear 32. In an embodiment, a transmission ratio of the first-level speed-increasing unit is 5, a transmission ratio of the second-level speed-increasing unit is 3, and a transmission ratio of the third-level speed-increasing unit is 4/3, so that the total transmission ratio is 5*3*4/3=20. After the three levels speed-increasing units, even the rotation speed of the driving element 2 is lower, the rotation speed of the output gear 32 is higher.

Therefore, the shaft of the electricity generator connected with the output gear 32 can be driven as the driving element 2 rotates in one direction, and keep motionless as the driving element 2 rotates in an opposite direction. The shaft of the electricity generator can have a high rotation speed. The rotor connected with the shaft of the electricity generator has a high rotation speed to generate a high induced electromotive force, thus, not only simplifying the design of the circuit board of the device, but also improving the efficiency of energy utilization.

Example 5

Figure 9:
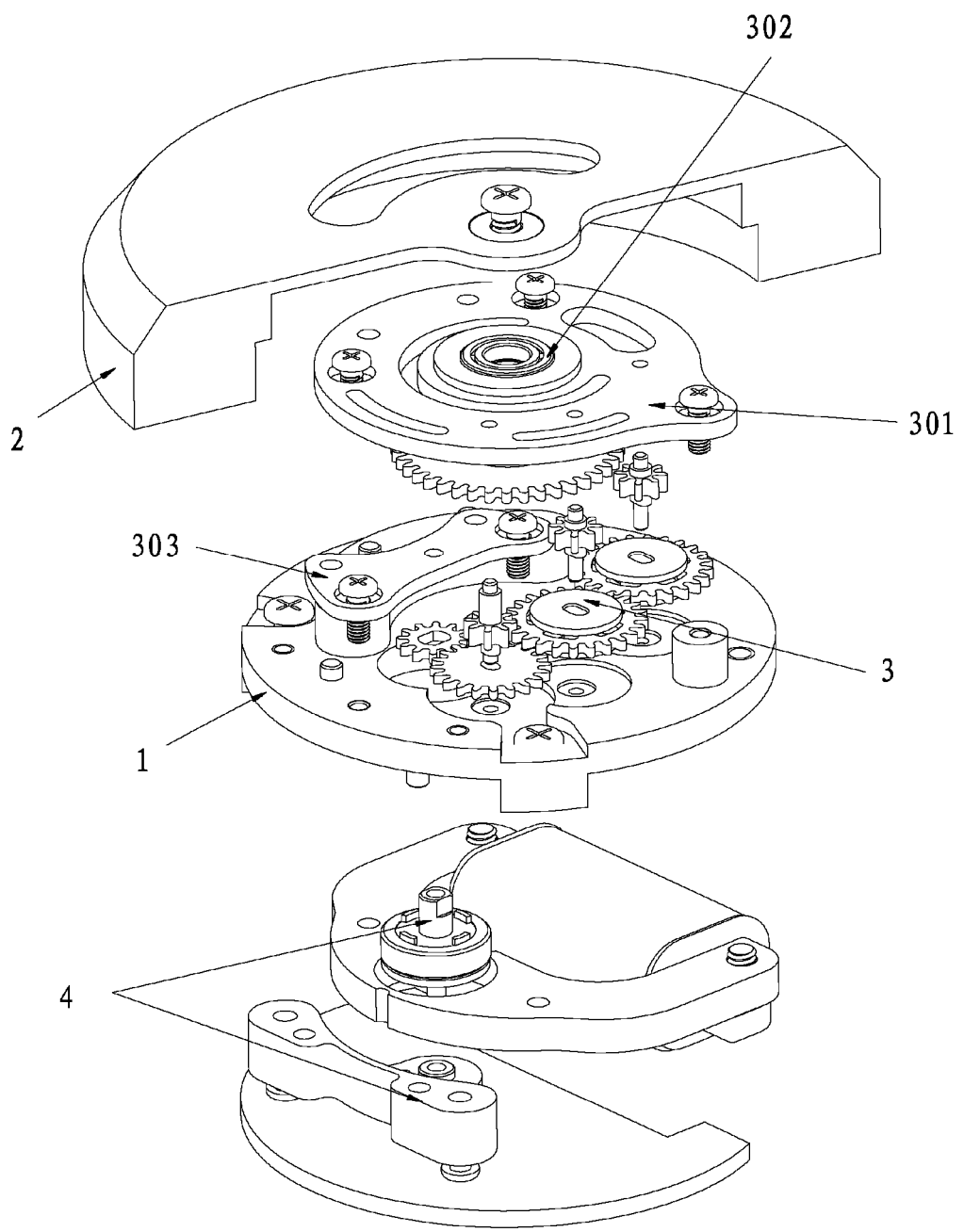
FIG. 9 shows an exploded perspective view of a device for generating electricity according to an embodiment of the present disclosure.
Figure 10:
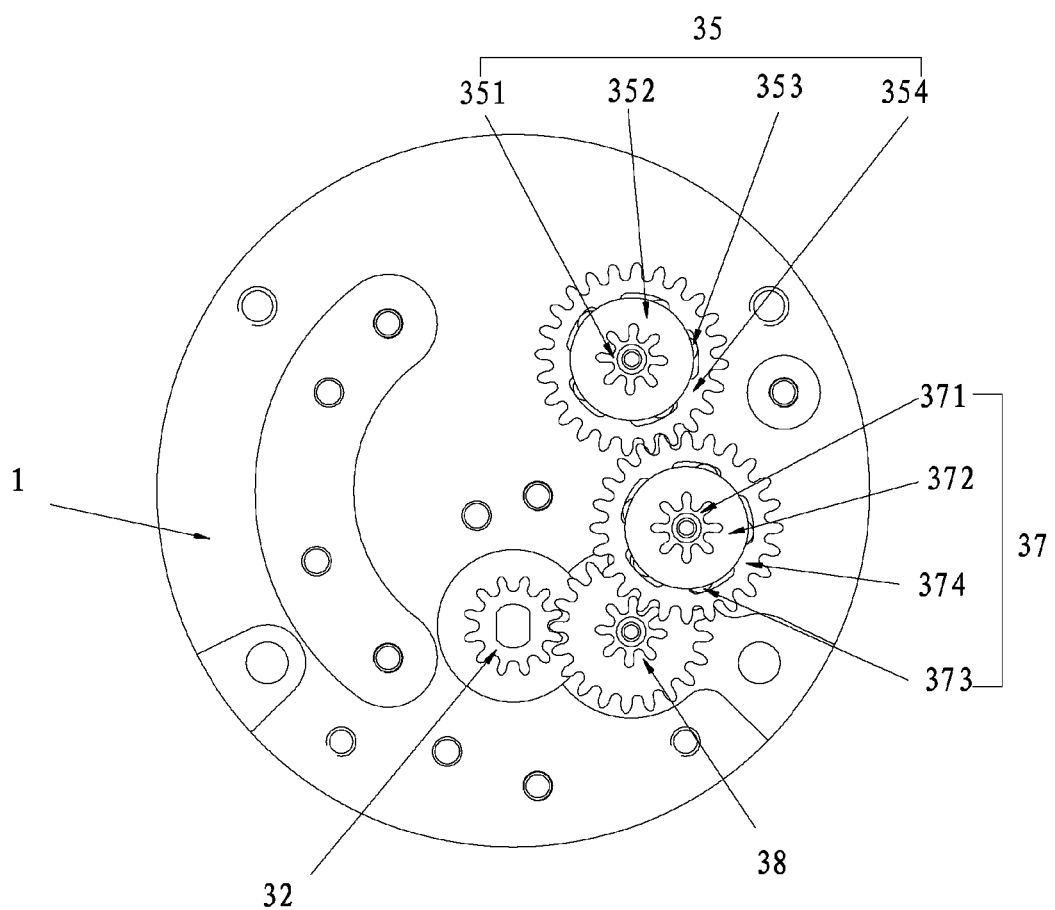
FIG. 10 shows a schematic view illustrating a support and a drive assembly of a device for generating electricity according to an embodiment of the present disclosure.
Figure 11:
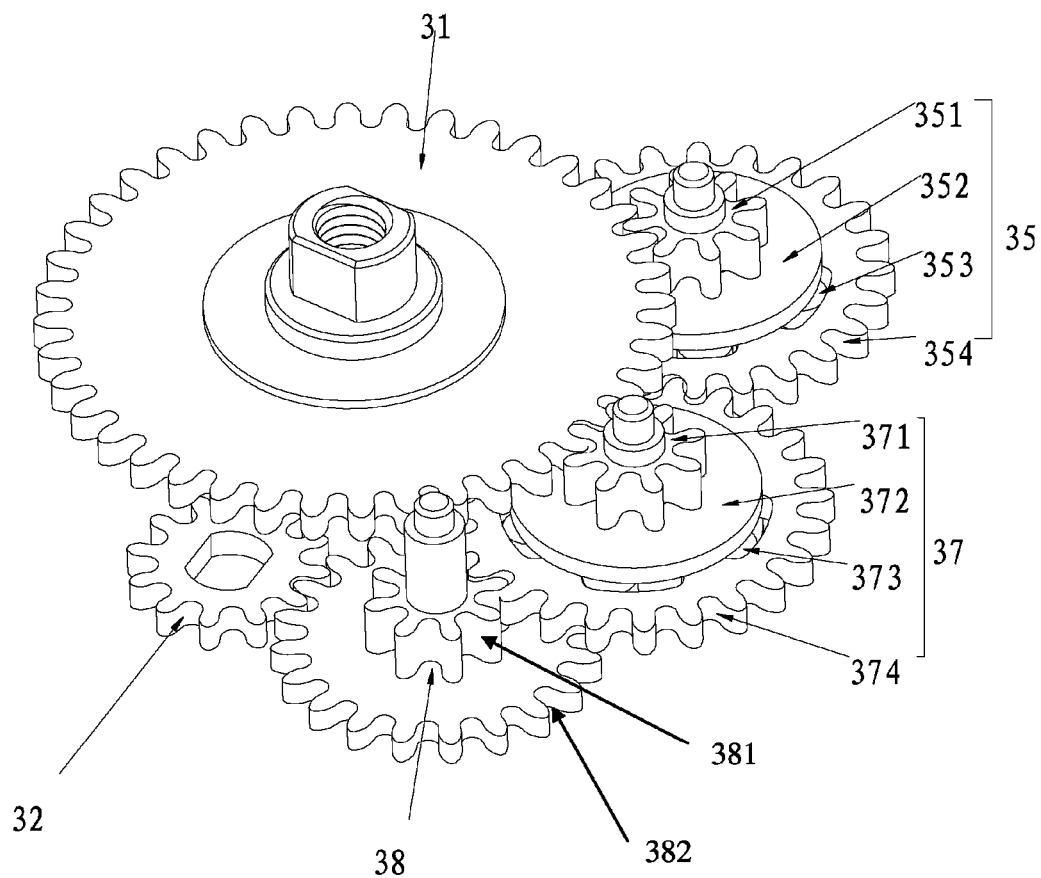
FIG. 11 shows a schematic view illustrating a drive assembly of a device for generating electricity according to an embodiment of the present disclosure.

As shown in FIGS. 9-11, the drive assembly 3 further includes a second one-way transmitting unit 37. The second one-way transmitting unit 37 is cooperated with the input gear 31, the output gear 32 and the first one-way transmitting unit 35, respectively.

The second one-way transmitting unit 37 includes a seventh gear 371, a second direction-switching column 372, an eighth gear 374 and a second direction-switching block 373. The seventh gear 371 is meshed with the input gear 31 and is rotatable in a third rotation direction (i.e., the anti-clockwise direction as shown in FIG. 10) and a fourth rotation direction (i.e., the clockwise direction as shown in FIG. 10).

In the third rotation direction, a gap is formed between the second direction-switching column 372 and second direction-switching block 373, or between the eighth gear 374 and the second direction-switching block 373. The second direction-switching column 372 is coupled with the seventh gear 371 so as to rotate with the seventh gear 371. The eighth gear 374 is meshed with the sixth gear 354.

The second direction-switching block 373 is configured to press the eighth gear 374 against the second direction-switching column 372 when the seventh gear 371 rotates in the fourth rotation direction so as to drive the eighth gear 374 rotate with the second direction-switching column 372, and to release the eighth gear 374 from the second direction-switching column 372 when the seventh gear 371 rotates in the third rotation direction such that the second direction-switching column 372 is rotatable independently relative to the eight gear 374.

The second one-way transmitting unit 37 has a substantially same structure with the first one-way transmitting unit 35, and the second one-way transmitting unit 37 has the opposite transmission direction with the first one-way transmitting unit 35. Those skilled in the art can easily understand the structure of the second one-way transmitting unit 37 according to the structure of the first one-way transmitting unit 35.

In some embodiments, the drive assembly 3 further includes a fourth speed-increasing gear set 38. The fourth speed-increasing gear set 38 includes a ninth gear 381 and tenth gear 382. A teeth number of the ninth gear 381 is less than that of the tenth gear 382. The fourth speed-increasing gear set 38 is meshed with the eighth gear 374 and the output gear 32 respectively. As shown in FIG. 11, the ninth gear 381 is meshed with eighth gear 374, and the tenth gear 382 is meshed with output gear 32.

In some embodiments of the present disclosure, the second direction-switching column 372 defines a fourth gear hole having a non-circular cross-section, and the seventh gear 371 has a fourth gear shaft (not shown) having a non-circular shaft and adapted to fit within the fourth gear hole.

In some embodiments of the present disclosure, the drive assembly 3 includes a first positioning plate 301, an input gear 31, a first one-way transmitting unit 35, a second one-way transmitting unit 37, a fourth speed-increasing gear set 38 and a second positioning plate 303. The first one-way transmitting unit 35 includes: a fifth gear 351, a first direction-switching column 352, a sixth gear 354 and a first direction-switching block 353. The second one-way transmitting unit 37 includes a seventh gear 371, a second direction-switching column 372, an eighth gear 374 and a second direction-switching block 373.

The rolling bearing 302 is disposed in the first positioning plate 301. The input gear 31 is coupled to the driving element 2. The inner ring of the rolling bearing 302 is fixedly connected with the input gear 31, and the outer ring of the bearing outer ring 302 is disposed in the first positioning plate 301 by interference fit. The input gear 31 is connected with the driving element 2 by mean of a screw. The rotation of the driving element 2 may drive the input gear 31 to rotate with the driving element 2.

The first direction-switching column 352 is connected with the fifth gear 351 to rotate with the firth gear 351. When the fifth gear 351 rotates in anti-clockwise, the first direction-switching column 352 rotates with the fifth gear 351 in anti-clockwise. The first direction-switching block 353 rotates in anti-clockwise due to the friction between the first direction-switching column 352 and the first direction-switching block 353. At the time, the direction-switching block 353 drives the sixth gear 354 rotates in anti-clockwise.

When the fifth gear 351 rotates in clockwise, the first direction-switching column 352 rotates with the fifth gear 351 in clockwise. At this time, due to a gap formed between the first direction-switching column 352 and the first direction-switching block 353, so that there is no friction between the first direction-switching column 352 and the first direction-switching block 353, and the first direction-switching column 352 is rotatable freely, the first direction-switching block 353 is motionless, such that the sixth gear 354 is motionless.

The second direction-switching column 372 is connected with the seventh gear 371 to rotate with the seventh gear 371. When the seventh gear 371 rotates in clockwise, the second direction-switching column 372 drives the eighth gear 374 to rotate in clockwise. When the seventh gear 371 rotates in anti-clockwise, because there is no friction between the second direction-switching column 372 and the second direction-switching block 373, the second direction-switching column 372 rotates freely, and at the time, the second direction-switching block 373 is motionless, and the eighth gear 374 is motionless.

The transmission directions of the first one-way transmitting unit 35 and the second one-way transmitting unit 37 are opposite. For example, when the first direction-switching column 352 drives the sixth gear 354 to rotate, there is no friction between the second direction-switching column 372 and the eighth gear 374 and the second direction-switching column 372 rotates freely, and vice versa.

In some embodiments of the present disclosure, the fifth gear 351 is meshed with the input gear 31. The eighth gear 374 is meshed with the sixth gear 354 and one gear of the fourth speed gear set 38 which has the less teeth number. And the output gear 32 is meshed with one gear of the fourth speed gear set 38 which has the larger teeth number.

The movement of the drive source drives the driving element 2 swinging back and forth. When the driving element 2 rotates in anti-clockwise, the input shaft 31 fixed with the driving element 2 is also rotated in anti-clockwise.

The fifth gear 351 meshed with the input gear 31 is rotated in an opposite direction, that is, in a clockwise direction. The fifth gear 351 is coupled with the first direction-switching column 352, so that the first direction-switching column 352 rotates in clockwise. At this time, due to a gap formed between the first direction-switching column 352 and the first direction-switching block 353, there is no friction between the first direction-switching column 352 and the first direction-switching block 353, and the both of the first direction-switching column 352 and the first direction-switching block 353 rotate freely. The seventh gear 371 meshed with the input shaft 31 rotates in clockwise, and the seventh gear 371 is coupled with the second direction-switching column 372, such that the second direction-switching column 372 rotates in clockwise. With the friction between the second direction-switching column 372 and the second direction-switching block 373, the second direction-switching column 372 drives the second direction-switching block 373 rotating in clockwise. And the second direction-switching block 373 drives the eighth gear 374 rotates in clockwise. The sixth gear 354 is meshed with the eighth gear 374, so the sixth gear 354 rotates in anti-clockwise. The output gear 32 rotates in clockwise via the fourth speed gear set 38.

When the driving element 2 rotates in clockwise, the input shaft 31 fixed with the driving element 2 is also rotated in clockwise. The fifth gear 351 meshed with the input gear 31 rotates in an opposite direction, that is, in anti-clockwise. The fifth gear 351 is coupled with the first direction-switching column 352, so that the first direction-switching column 352 rotates in anti-clockwise. With the friction between the first direction-switching column 352 and the second direction-switching block 373, the first direction-switching column 352 drives the second direction-switching block 373 to rotate in anti-clockwise, and second direction-switching block 373 drives the sixth gear 354 to rotate in anti-clockwise. Since the seventh gear 371 is meshed with the input gear 31, the seventh gear 371 rotates in anti-clockwise. The seventh gear 371 is also coupled with the second direction-switching column 372, such that the second direction-switching column 372 rotates in anti-clockwise. At this time, due to a gap formed between the second direction-switching column 372 and second direction-switching block 373, there is no friction between the second direction-switching column 372 and second direction-switching block 373, therefore, the both of the second direction-switching column 372 and second direction-switching block 373 rotate freely. Since the sixth gear 354 is meshed with the eighth gear 374, the eighth gear 374 rotates in clockwise. The rotation of the eighth gear 374 drives the output gear 32 rotates in clockwise through the fourth speed gear set 38.

Therefore, no matter the driving element 2 rotates in clockwise or anti-clockwise, the output gear 32 rotates in clockwise. For example, the rotation speed may be increased via a first-level speed-increasing unit formed by the input gear 31 and the seventh gear 371, a second-level speed-increasing unit formed by the eighth gear 374 and ninth gear 381, and a third-level speed-increasing unit formed by tenth gear 382 and the output gear 32. In an embodiment, a transmission ratio of the first-level speed-increasing unit is 5, a transmission ratio of the second-level speed-increasing unit is 3, and a transmission ratio of the third-level speed-increasing unit is 4/3, so that the total transmission ratio is 5*3*4/3=20. Meanwhile, the drive assembly 3 has the function of increasing the speed. After the speed-increasing, even the rotation speed of the driving element 2 is lower, the rotation speed of the output gear 32 is higher.

Therefore, the shaft of the electricity generator connected with the output gear 32 has a high rotation speed. The rotor connected with the shaft of the electricity generator has a high rotation speed to generate a high induced electromotive force, thus, not only simplifying the design of the circuit board of the device but also improving the efficiency of energy utilization.

Example 6

Figure 17:
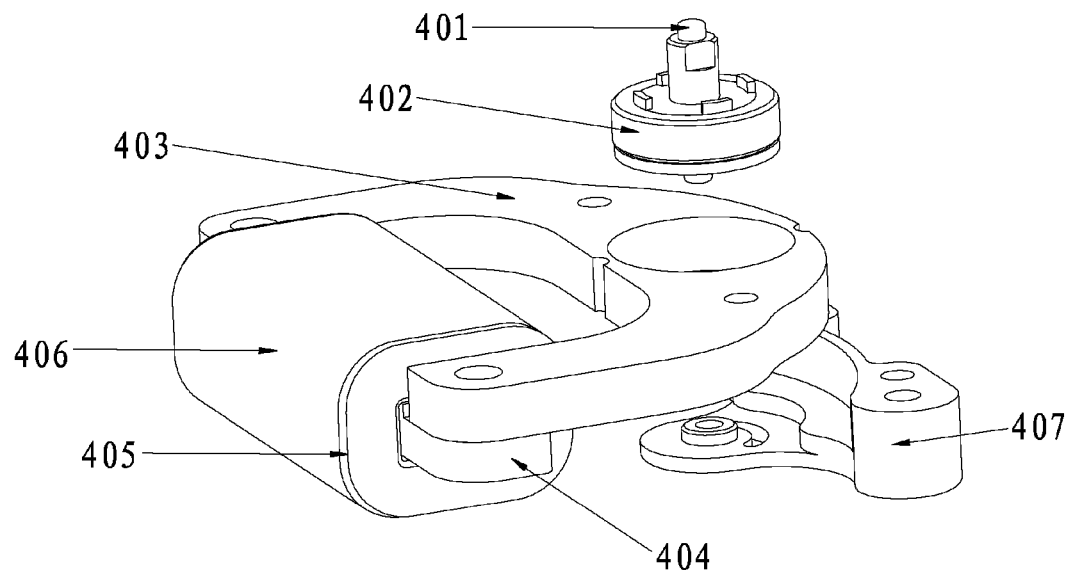
FIG. 17 shows a schematic view of a device for generating electricity according to an embodiment of the present disclosure.

The electricity generator 4 is a micro-stepping permanent magnet generator, as shown in FIG. 17, The electricity generator 4 includes a shaft 401, a rotor 402, a first stator core 403, a second stator core 404, a winding frame 405, a winding 406 and a third positioning plate 407 disposed below the rotor 402. The shaft 401 is mounted on the third positioning plate 407 and a second positioning plate 303, and is rotatable with relative to the third positioning plate 407 and the second positioning plate 303. A sleeve of the rotor 402 is fitted over the shaft 401. The rotor 402 is connected with the input gear 31, such that the input gear 31 can drive the rotor 402 to rotate in same speed and direction. The rotor 402 includes an annular permanent magnet, and the annular permanent magnet is a NdFeB (neodymium-iron-boron) permanent magnet. The NdFeB permanent magnet has a high remanence after magnetizing. For example, after magnetizing by a magnetizing device of 900V, the remanence magnetization is 1.3T. After magnetizing, the annular permanent magnet forms an N pole and an S pole. The first stator core 403 has a rotor hole, and the rotor 402 is rotatably fitted in the rotor hole. The first stator core 403 and the second stator core 404 form a primary magnetic circuit. The first stator core 403 and the second stator core 404 are fixed on a shell 1 of the electricity generator 4 by a screw. When the rotor 402 rotates within the rotor hole, the annular permanent magnet rotates with the rotor 402 and generates a varying magnetic field. The winding frame 405 is disposed on the second stator core 404, and the winding 406 is wound around on the winding frame 405. When the magnetic field is varied, an induced electromotive force is generated from the winding 406.

Figure 18:
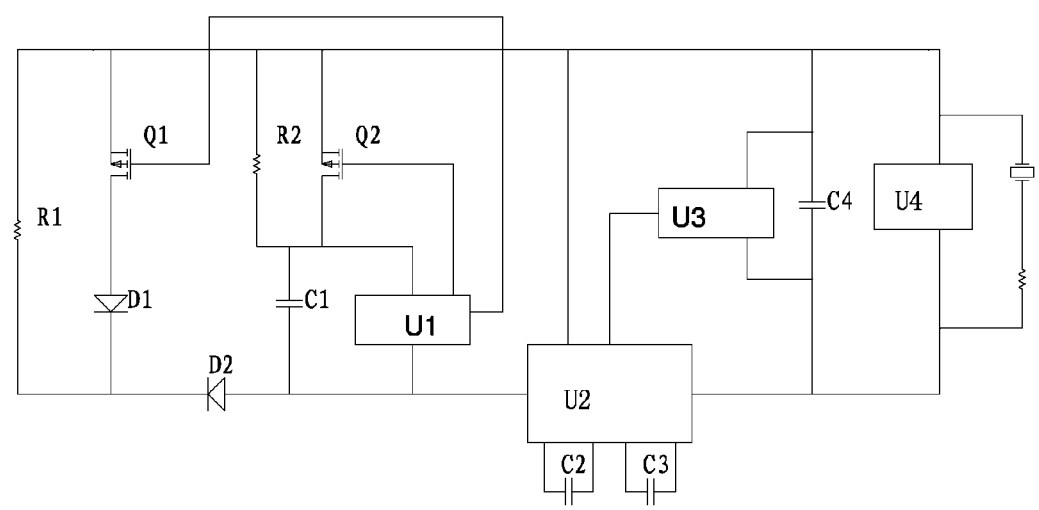
FIG. 18 shows a schematic circuit diagram of a circuit board of a device for generating electricity according to an embodiment of the present disclosure.

The circuit board 5 is connected to the winding 406. The circuit board 5 has the function of regulating, rectifying, and storing. As shown in FIG. 18, the circuit board 5 uses a hierarchical charge way to collect energy. The first stage is formed by a generator coil R1, a MOSFET Q1, a MOSFET Q2, a diode D1, a diode D2, a resistor R2 and a capacitor C1. The rotation of the generator coil R1 generates an alternating current, and the alternating current charges the capacitor C1 through the resistor R2 and the diode D2 with a half-wave rectification way. The Vsc detecting circuit U1 is configured as the voltage detecting circuit for monitoring the voltage across the capacitor C1. When the voltage of the capacitor C1 is charged to a specific value (For example, 0.4V), the Vsc detecting circuit U1 sends signal to MOSFET Q2 to short the resistor R2, at the time, the generator coil R1, the diode D1 can charge the capacitor C1 directly without the resistor R2, which may increases the charging efficiency. And then the Vsc detecting circuit U1 starts multi-stage booster circuit U2 to start the second level circuit to work. The second level circuit includes a multi-stage booster circuit U2, a capacitor C2, a capacitor C3, a capacitor C4, and a Vss detecting circuit U3. When voltage of the capacitor C1 boosts to 1.2V-2.3V, the multi-stage booster circuit U2 charges the capacitor C4 according to the voltage of the capacitor C1, and the Vss detecting circuit U3 detects the signal from the capacitor C4 and controls the boosting ratio of the multi-stage booster circuit U2. The capacitor C4 supplies power to an external device circuit U4, for example, a watch circuit.

In the first stage booster circuit, the MOSFET Q1 and the diode D1 are configured as a protection circuit to prevent the voltage across the capacitor C1 from exceeding a maximum allowed value. When the Vsc detecting circuit U1 detects that the capacitor C1 exceeds the maximum allowed value, the Vsc detecting circuit U1 may send a signal to the MOSFET Q1 to turn on, and then the generator coil R1, the MOSFET Q1 and the diode D1 may form a loop to prevent the capacitor C1 from damage.

With reference to the principle described above, an actual circuit can be simplified, because an output voltage of an output end B1 of the electricity generator 4 is 1-4V, which is within the tolerance range of the capacitor C1, so the protection circuit may be removed, but still using the two-stage charging way to store energy.

Figure 19:
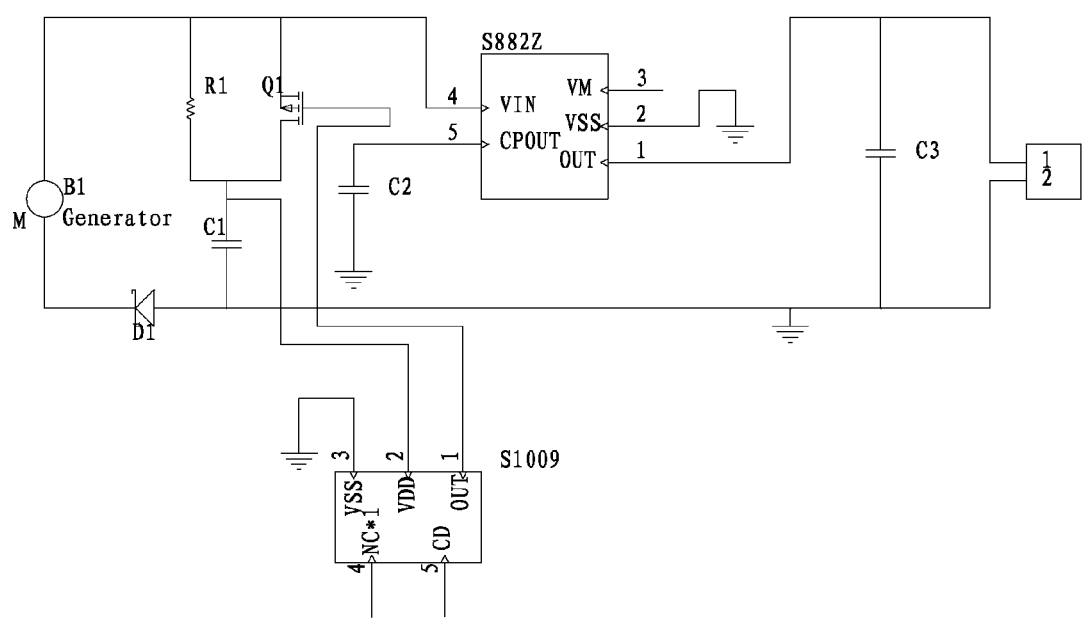
FIG. 19 shows a schematic circuit diagram of a circuit board of a device for generating electricity according to an embodiment of the present disclosure.

As shown in FIG. 19, B1 is the output end of the electricity generator 4, and the generator coil R1, the MOSFET Q1, the capacitor C1 and the diode D1 constitute a first stage charging circuit. When there is output from the electricity generator 4, the output end B1, the generator coil R1, the capacitor C1, the diode D1, and a voltage detector S1009 are formed as a half-wave rectifier circuit to charge the capacitor C1. The voltage detector S1009 functions to monitor the voltage across the capacitor C1, when the voltage across C1 reaches a preset value, the voltage detector S1009 sends a signal to the MOSFET Q1. The output end B1, the capacitor C1 and the diode D1 are directly formed a charging circuit to charge the capacitor C1, which may improve the charging efficiency.

The capacitor C2, a DC/DC voltage converter S882Z, and the capacitor C3 are configured as a second-stage charging circuit. The DC/DC voltage converter S882Z is configured to boost an input voltage to a fixed value and output it. And the DC/DC voltage converter S882Z starts to work when the capacitor C1 is charged to a predetermined voltage. And the DC/DC voltage converter S882Z outputs a fixed voltage to the capacitor C3. The capacitor C3 is configured as the second-stage energy storage unit.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A device for generating electricity, comprising:
   a support;
   a driving element rotatably mounted on the support;
   an electricity generator disposed on the support;
   a circuit board connected to the electricity generator, and
   a drive assembly disposed on the support and comprising an input gear and an output gear, wherein the driving element is coupled with the input gear to drive the input gear to rotate, and wherein the output gear is coupled with the electricity generator and driven to rotate by the input gear,
   wherein the drive assembly further comprises a first one-way transmitting unit coupled with the input and output gears respectively.

2. The device according to claim 1, wherein the drive assembly further comprises a first speed-increasing gear set comprising:
   a first gear meshed with the input gear; and
   a second gear coupled with the first gear coaxially to rotate with the first gear, the second gear being meshed with the output gear.

3. The device according to claim 2, wherein a teeth number of the first gear is less than a teeth number of the second gear.

4. The device according to claim 2, wherein the second gear defines a first gear hole having a non-circular cross-section, and the first gear has a first gear shaft having a non-circular cross-section and adapted to fit within the first gear hole.

5. The device according to claim 1, wherein the drive assembly further comprises a first speed-increasing gear set and a second speed-increasing gear set,
   wherein the first speed-increasing gear set comprises a first gear meshed with the input gear, and a second gear coupled with the first gear coaxially to rotate with the first gear;
   wherein the second speed-increasing gear set comprises a third gear meshed with the second gear, and a fourth gear coupled with the third gear coaxially to rotate with the third gear, the fourth gear being meshed with the output gear.

6. The device according to claim 5, wherein a teeth number of the first gear is less than a teeth number of the second gear, and a teeth number of the third gear is less than a teeth number of the fourth gear.

7. The device according to claim 5, wherein the second gear defines a first gear hole having a non-circular cross-section, and the first gear has a first gear shaft having a non-circular cross-section and adapted to fit within the first gear hole;
   wherein the fourth gear defines a second gear hole having a non-circular cross-section, and the third gear has a second gear shaft having a non-circular cross-section and adapted to fit within the second gear hole.

8. The device according to claim 1, wherein the first one-way transmitting unit comprises:
   a fifth gear meshed with the input gear and rotatable in a first rotation direction and a second rotation direction;
   a first direction-switching column coupled with the fifth gear so as to rotate with the fifth gear;
   a sixth gear meshed with the output gear; and
   a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear.

9. The device according to claim 8, wherein the first direction-switching column defines a third gear hole having a non-circular cross-section, and the fifth gear has a third gear shaft having a non-circular shaft and adapted to fit within the third gear hole.

10. The device according to claim 1, wherein the drive assembly further comprises a first one-way transmitting unit and a third speed-increasing gear set,
   wherein the first one-way transmitting unit comprises:
      a fifth gear meshed with the input gear and rotatable in a first rotation direction and a second rotation direction;
      a first direction-switching column coupled with the fifth gear so as to rotate with the fifth gear;
      a sixth gear; and
      a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear;
   wherein the third speed-increasing gear set is meshed with the sixth gear and the output gear respectively.

11. The device according to claim 10, wherein the first direction-switching column defines a third gear hole having a non-circular cross-section, and the fifth gear has a third gear shaft having a non-circular cross-section and adapted to fit within the third gear hole.

12. The device according to claim 1, wherein the drive assembly further comprises a first one-way transmitting unit, a second one-way transmitting unit and a fourth speed-increasing gear set,
   wherein the first one-way transmitting unit comprises:
      a fifth gear meshed with the input gear and rotatable in a first rotation direction and a second rotation direction;
      a first direction-switching column coupled with the fifth gear so as to rotate with the fifth gear;
      a sixth gear, and
      a first direction-switching block configured to press the sixth gear against the first direction-switching column when the fifth gear rotates in the first rotation direction so as to drive the sixth gear to rotate with the first direction-switching column, and to release the sixth gear from the first direction-switching column when the fifth gear rotates in the second rotation direction such that the first direction-switching column is rotatable independently relative to the sixth gear;
   wherein the second one-way transmitting unit comprises:
      a seventh gear meshed with the input gear and rotatable in a third rotation direction and a fourth rotation direction;
      a second direction-switching column coupled with the seventh gear so as to rotate with the seventh gear;
      an eighth gear meshed with the sixth gear; and
      a second direction-switching block configured to press the eighth gear against the second direction-switching column when the seventh gear rotates in the fourth rotation direction so as to drive the eighth gear rotate with the second direction-switching column, and to release the eighth gear from the second direction-switching column when the seventh gear rotates in the third rotation direction such that the second direction-switching column is rotatable independently relative to the eight gear;
   wherein the fourth speed-increasing gear set is meshed with the eighth gear and the output gear respectively.

13. The device according to claim 12, wherein the first direction-switching column defines a third gear hole having a non-circular cross-section, and the fifth gear has a third gear shaft having a non-circular cross-section and adapted to fit within the third gear hole; and
   wherein the second direction-switching column defines a fourth gear hole having a non-circular cross-section, and the seventh gear has a fourth gear shaft having a non-circular cross-section and adapted to fit within the fourth gear hole.

14. The device according to claim 1, wherein the driving element comprises a pendulum body.

15. The device according to claim 14, wherein the pendulum body comprises a pendulum bob.

16. A device for generating electricity, comprising:
   a support;
   a pendulum body rotatably mounted on the support;
   an electricity generator disposed on the support;
   a circuit board connected to the electricity generator, and
   a drive assembly disposed on the support and comprising an input gear and an output gear, wherein the driving element is coupled with the input gear to drive the input gear to rotate, and wherein the output gear is coupled with the electricity generator and driven to rotate by the input gear,
   wherein the drive assembly further comprises a first one-way transmitting unit coupled with the input and output gears respectively.

* * * * *